United States Patent Office

2,993,049
AMINOMETHYL-SUBSTITUTED CONDENSED HETEROCYCLIC COMPOUNDS

Newman M. Bortnick, Oreland, and Marian F. Fegley, Mont Clare, Pa., assignors to Rohm & Haas Company, Philadelphia, Pa., a corporation of Delaware
No Drawing. Filed June 18, 1958, Ser. No. 742,729
15 Claims. (Cl. 260—256.4)

This invention deals with specific aminomethyl-substituted condensed heterocyclic compounds as new compositions of matter. It also deals with a method for the preparation of these specific aminomethyl-substituted condensed heterocyclic compounds.

The compounds of this invention are prepared by hydrogenating a compound having the formula

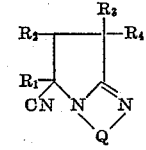

to produce a compound having the formula

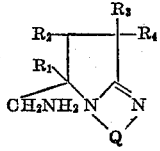

The symbol $R_1$ represents a hydrocarbon group of one to ten carbon atoms, preferably alkyl, aralkyl, cycloalkyl, aryl, and alkaryl. The symbol $R_2$ represents a hydrogen atom or an alkyl group of one to four carbon atoms. The symbols $R_3$ and $R_4$ may be hydrogen or hydrocarbon groups of one to ten carbon atoms including alkyl, aralkyl, cycloalkyl, aryl, and alkaryl groups. In addition, $R_1$ and $R_2$ taken together with the carbon atoms to which they are joined may form a carbocyclic ring containing five to six carbon atoms which in turn may have alkyl substituents containing a total of no more than four additional carbon atoms. In addition, $R_2$ and $R_3$ taken together with the carbon atoms to which they are joined may form a carbocyclic ring containing five to six carbon atoms which in turn may have alkyl substituents containing a total of no more than four additional carbon atoms. In addition, $R_3$ and $R_4$ when taken together with the carbon atom to which they are joined may form a carbocyclic ring containing five to six carbon atoms which in turn may have alkyl substituents containing a total of no more than four additional carbon atoms. The total number of carbon atoms in the groups $R_1$, $R_2$, $R_3$, and $R_4$ should not exceed 20. The preferred embodiments are those in which $R_1$ and $R_4$ are alkyl groups, $R_2$ is a hydrogen atom, and $R_3$ is a methyl group. $R_1$, $R_3$, and $R_4$ may typically individually represent methyl, butyl, octyl, benzyl, phenylbutyl, cyclopentyl, cyclohexyl, phenyl, naphthyl, butylphenyl groups, and the like.

The symbol Q represents a chain of two to three carbon atoms between the two nitrogen atoms to which it is joined. Q may be a straight chain alkylene group, an alkyl-substituted alkylene group, or a cycloalkyl, aryl, or aralkyl group as long as there are no more than two to three carbon atoms between the two primary amino groups. While the upper limit of carbon atoms in Q is not especially critical, about 18 is considered the practical upper limit. Also, while the group Q may contain alkyl substituents, it is necessary that the carbon atom directly attached to the nitrogen which is in turn attached to the carbon atom containing the $R_1$ group, be attached to no more than two carbon atoms.

Typical representations of the Q group include

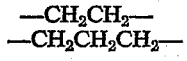
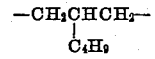
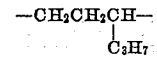
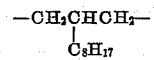
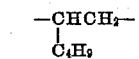
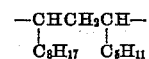
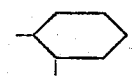
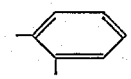
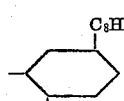
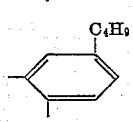

and

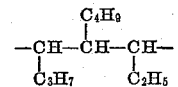

Illustrative heterocyclic reactants include 5-cyano-2,3,5,6 - tetrahydro-5,7,7-trimethyl-(7H)-imidazo[1,2-a]-pyrrole, 5 - cyano-5,6-dimethyl-2,3,5,6-tetrahydro-(7H)-imidazo[1,2 - a]pyrrole, 5-cyano-5,7-dimethyl-7-(2,2-dimethylpropyl)-2,3,5,6 - tetrahydro-(7H)-imidazo[1,2-a-]-pyrrole, 5-cyano-2(or 3),7-dimethyl-5,7-diphenyl-2,3,5,6-tetrahydro - (7H)-imidazo[1,2-a]pyrrole, spiro{[3,3-dimethylbicyclo(2.2.1)heptane-2,7'-[5'-cyano-2'(or 3'),5'-dimethyl - 2',3',5',6'-tetrahydro-(7'H)-imidazo[1,2-a]pyrrole]}, 4a-cyano - 2,3,4a,5,6,7,8,8a-octahydro-2(or 3),6,9,9-tetramethyl-(9H)-indolo[1,2-a]imidazole, 6-cyano-2,3,-4,6,7,8 - hexahydro-6,8,8-trimethylpyrrolo[1,2-a]pyrimidine, 6-cyano-6-methyl-2,3,4,6,6a,7,8,9,10,10a-decahydro-isoindolo[1,2-a]pyrimidine, and 1-cyano-1,3,3-trimethyl-1,2-dihydro-(3H)-pyrrolo[1,2-a]benzimidazole. These reactants may be prepared according to our copending application Serial Number 742,751, filed June 18, 1958.

The present hydrogenation is carried out in the presence of a catalyst. Suitable as catalysts are Raney nickel, Raney cobalt, cobalt with ammonia, nickel with ammonia, cobalt-copper, nickel-cobalt, palladium, platinum, ruthenium, and the like. The catalyst may be employed in any convenient particle size. Generally, the smaller particle sizes produce the higher rates. If desired, the catalyst may be deposited on a carrier material in order to extend and activate it. Suitable for use as a carrier are activated alumina, activated clays, silica gel, charcoal, asbestos, pumice, and the like. Room temperatures and somewhat above may be employed when a noble metal is used as the catalyst. When the other materials are employed as catalysts, temperatures in the range of about 75° to 250° C. are employed with about 100° to 200° C. preferred. It is preferred that the hydrogenation be carried out at the lowest temperature at which reduction can occur within the ranges previously set out. An inert, volatile, organic solvent may be desirable, such as hydrocarbons, alcohols, ethers, and the like. The lower alkanols, such as methanol or ethanol, are particularly suited for this use. When the noble metals are used as catalysts, a small amount of an activating acid, such as acetic or hydrochloric may be employed.

Pressures in the range of atmospheric to 10,000 p.s.i.g. are employed. Actually, higher pressures may be used if desired but in most instances, no apparent advantages are achieved for the extra effort extended. The reaction shown proceeds a little more rapidly at the higher pressures but lower pressures may be successfully employed with some of the catalysts, especially Raney nickel. The preferred range of pressures is atmospheric to 100 p.s.i.g. when noble metal catalysts are employed and 250 to 5000 p.s.i.g. when the transition metal catalysts are used.

The present reaction should be concluded as soon as two moles of hydrogen have reacted. Otherwise, if the reaction is conducted for periods of time that are substantially longer than that required for two moles of hydrogen to react, there is some chance that hydrogenolysis of the ring may occur. In some instances, this has been observed when the reaction was conducted for prolonged periods of time. While no specific time limit in minutes or hours can be given, since actual times will vary with heterocyclic reactants, catalysts, temperatures, and pressures, it is emphasized that the reaction should be concluded after substantially two moles of hydrogen has reacted.

A preferred way of consumating the present reaction is to introduce the heterocyclic reactant along with a catalyst of the type decribed heretofore into a pressure retention reaction vessel and add hydrogen until a certain desired pressure is reached. The reaction vessel or at least the reaction ingredients may be preferably agitated such as by stirring or rotating until a precalculated drop in pressure is observed. This significant drop in pressure indicates that an equivalent amount of hydrogen has reacted. This precalculated pressure drop, indicating that an equivalent amount of hydrogen has reacted, is readily calculable by known methods. Therefore, an indication of reaction completion may be readily calculated and observed.

At the conclusion of the reaction, the product is obtained by filtering off the catalyst and stripping off the solvent. If desired, the products may be purified by distillation or recrystallization from hydrocarbons, ethers, or the like.

The products that are obtained are useful hypotensive agents and in such applications there are no observable untoward effects. They are also useful as oil additives for lubricating oils to minimize and substantially prevent the formation and deposition of sludge.

In addition to the valuable physiological properties these materials possess, the aminomethyl group serves as a means for introducing the imidazopyrrole system into polymeric substances. Thus, it is straightforward to convert the aminomethyl derivative by means of methacryloyl chloride or acryloyl chloride to the corresponding acrylamides. These polymerizable strongly basic amides confer dispersing activity when copolymerized in minor amounts with long chain acrylate and methacrylate esters. These imidazopyrrole-containing polymers are particularly useful as sludge disperants in oil additive applications and as thickeners in dispersing agents for polar particles in non-polar media.

The compounds of this invention have been presented in their free-base form and in this free-base form, they possess the valuable characteristics and concurred utilities previously referred to. However, it is to be construed that the present invention includes the acid addition salts of these free-base products. It is desirable, in some instances, to employ the present products in their water-soluble salt form. For instance, in pesticidal applications, it is highly desirable to deal with water-soluble compounds in order that satisfactory spray solutions may be formulated. In other applications, wherein any physiological benefits are desired, it is frequently advantageous to employ the preent products in this physiological acceptable organic salt form in order to provide the stability and physiology required.

In order to prepare the salt forms of the present compounds, it is necessary only to react these compounds with a stoichiometric amount of the selected acid. The salt formation occurs readily at room temperature without the aid of a catalyst. If solid reactants are employed, it may be advantageous to use an inert volatile solvent such as benzene, toluene, xylene, hexane, heptane, methylene chloride, chloroform and the like. The solvent can then be readily removed at the conclusion of the reaction by conventional methods. The salt product does not require any further purification although recrystallization from a solvent such as isooctane may be resorted to if a product of high purity is demanded.

While the method for the preparation of the salts is believed to be clear to one skilled in the art from the above description, such salt formation may be specifically illustrated by indicating that one takes an equivalent amount of a selected compound of this invention in its free-base form and then adds a stoichiometric amount of a selected acid, for instance 36.5 parts of hydrochloric acid, 98 parts of sulfuric acid, 60 parts of acetic acid, 72 parts of acrylic acid, and the like. The corresponding hydrochloric, sulfuric, acetic and acrylic acid addition salts respectively are readily formed. Similarly, other salt products may be prepared.

Typical organic and inorganic acids that may be employed are formic acid, acetic acid, propionic acid, butyric acid, caproic acid, capric acid, lauric acid, myristic acid, palmitic acid, stearic acid, acrylic acid, methacrylic acid, crotonic acid, undecylenic acid, oleic acid, linoleic acid, linolenic acid, ricinoleic acid, propiolic acid, butynoic acid, cyclobutanecarboxylic acid, norcamphane-2-carboxylic acid, benzoic acid, resorcylic acid, oxalic acid, succinic acid, glutaric acid, adipic acid, sebacic acid, salicylic acid, maleic acid, fumaric acid, glutaconic acid, saccharic acid, dodecanedioic acid, octendioic aid, cyclohexaneacetic acid, cyclopentaneacetic acid, tridecanoic acid, hexynedioic acid, phthalic acid, cinnamic acid, benzenesulfonic acid, ethanesulfonic acid, naphthalenesulfonic acid, toleunesulfinic acid, glutamic acid, glyoxalic acid, phenylglyoxalic acid, pyruvic acid, levulinic acid, hydrochloric acid, hydrobromic acid, sulfuric acid, perchloric acid, carbonic acid, nitric acid, and phosphoric acid.

The compounds of this invention, as well as the methods for their preparation, may be more fully understood from the following example which is offered by way of illustration and not by way of limitation. Parts by weight are used throughout.

*Example*

5 - cyano-2,3,5,6-tetrahydro-5,7,7-trimethyl-(7H)-imidazo-[1,2-a]pyrrole (240 parts) and dry Raney nickel catalyst (10 parts) are heated at 130°–140° C. for 2 hours under hydrogen at 1600 p.s.i.g. at which point slightly more than two moles of hydrogen per mole of the cyano compound has been absorbed and uptake of hydrogen has become quite slow. The reactor is vented, the catalyst is separated by filtration and the filtrate is distilled under reduced pressure to give the product, 5-aminomethyl-2,3, 5,6 - tetrahydro - 5,7,7-trimethyl-(7H)-imidazo[1,2-a]-pyrrole, having a boiling point of 90° C. at 0.4 mm. The product is obtained in a 77% yield (188 parts) and solidifies on standing in the receiver. The product contains 22.8% nitrogen (23.1% theoretical), and has a neutral equivalent of 93.0 (90.5 theoretical).

It is important in this hydrogenation to keep the temperature as low as possible and to terminate the hydrogenation when the theoretical two moles of hydrogen per mole of nitrile has been absorbed. Failing to observe these precautions leads to further uptake of hydrogen and hydrogenolysis of the imidazo-pyrrole system occurs. One of the hydrogenolysis products which can be obtained is 1-(2-aminoethyl)-2-aminomethyl-2,4,4-trimethylpyrrolidine.

In a similar fashion 5-cyano-5,6-dimethyl-2,3,5,6-tetrahydro-(7H)-imidazo[1,2-a]pyrrole gives 5-aminomethyl-5,6 - dimethyl - 2,3,5,6-tetrahydro-(7H)-imidazo [1,2-a]-pyrrole, 5 - cyano-5,7-dimethyl-7-(2,2-dimethylpropyl)-2,3,5,6 - tetrahydro - (7H)-imidazo[1,2-a]pyrrole gives 5 - aminomethyl - 5,7-dimethyl-7-(2,2-dimethylpropyl)-2,3,5,6 - tetrahydro-(7H)-imidazo[1,2-a]pyrrole, 5-cyano-2(or 3),7-dimethyl-5,7-diphenyl-2,3,5,6-tetrahydro-(7H)-imidazo[1,2-a]pyrrole gives 5-aminomethyl-2(or 3),7-dimethyl - 5,7-diphenyl-2,3,5,6-tetrahydro-(7H)-imidazo-[1,2-a]pyrrole, spiro{cyclohexane - 1,9'-[4a'-cyano-2',3',4a',5'6',7',8',8a' - octahydro-(9'H) - indolo[1,2-a]imidazole]} gives spiro{cyclohexane-1,9'-[4a'-aminomethyl-2',3',4a',5',6',7',8',8a' - octahydro-(9'H) - indolo[1,2-a]-imidazole]}, spiro{[3,3 - dimethylbicyclo(2.2.1)heptane-2,7'-[5'-cyano-2'(or 3'), 5'-dimethyl-2',3',5',6'-tetrahydro-(7'H)-imidazo[1,2-a]pyrrole]} gives spiro{[3,3-dimethylbicyclo(2.2.1) - heptane-2,7'-[5'-aminomethyl-2'(or 3'),5' - dimethyl-2',3',5',6'-tetrahydro-(7'H)-imidazo-[1,2-a]pyrrole), 4a-cyano-2(or 3),6,9,9-tetramethyl-2,3,4a,5,6,7,8,8a - octahydro - (9H)-indolo[1,2-a]imidazole gives 4a-aminomethyl-2(or 3),6,9,9-tetramethyl-2,3,4a,5,6,7,8,8a - octahydro - (9H)-indolo[1,2-a]imidazole, 6-cyano-6,8,8 - trimethyl - 2,3,4,6,7,8-hexahydropyrrolo[1,2-a]-pyrimidine gives 6-aminomethyl-6,8,8-trimethyl-2,3,4,6,7,8-hexahydropyrrolo[1,2-a]pyrimidine, 6-cyano-6-methyl-2,3,4,6,6a,7,8,9,10,10a - decahydroisoindolo [1,2-a]pyrimidine gives 6 - aminomethyl-6-methyl-2,3,4,6,6a,7,8,9,10,10a-decahydroisoindolo[1,2-a]pyrimidine, and 1-cyano-1,3,3 - trimethyl - 1,2-dihydro-(3H)-pyrrolo[1,2-a]benzimidazole gives 1 - aminomethyl-1,3,3-trimethyl-1,2-dihydro-(3H) -pyrrolo[1,2-a]-benzimidazole.

These aminomethyl substituted imidazopyrroles have further utility in that they may be hydrolyzed to give di-aminopyrrolidinones which have utility in polyamide synthesis. This hydrolysis may be carried out in the presence of alkaline catalysts but higher yields are obtained by simply heating with water at temperatures of about 200° C. under super atmospheric pressure. Under these conditions yields in excess of 90% are obtained.

We claim:

1. As a composition of matter, a member from the class consisting of the compound having the formula

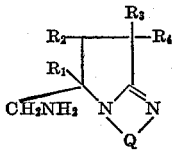

and the acid addition salts thereof, in which $R_1$ taken individually represents a member from the group consisting of alkyl, phenylalkyl, cycloalkyl, phenyl, naphthyl, and alkylphenyl of up to 10 carbon atoms, $R_2$ taken individually represents a member from the group consisting of hydrogen and alkyl of 1 to 4 carbon atoms, $R_3$ and $R_4$ taken individually represent members from the group consisting of alkyl, cycloalkyl, phenylalkyl, phenyl, naphthyl, and alkylphenyl of up to 10 carbon atoms, $R_1$ and $R_2$ taken collectively with the carbon atoms to which they are joined form a member from the group consisting of a saturated carbocyclic ring of 5 to 6 carbon atoms and said ring having alkyl substituents consisting of a total of up to 4 carbon atoms, $R_2$ and $R_3$ taken collectively with the carbon atoms to which they are joined form a member from the group consisting of a saturated carbocyclic ring of 5 to 6 carbon atoms and said ring having alkyl substituents consisting of a total of up to 4 carbon atoms, and $R_3$ and $R_4$ taken collectively with the carbon atoms to which they are joined form a member from the group consisting of a saturated carbocyclic ring of 5 to 6 carbon atoms and said ring having alkyl substituents consisting of a total of up to 4 carbon atoms, and Q represents a hydrocarbon chain of 2 to 3 carbon atoms between the nitrogen atoms to which it is joined, said Q containing up to about 18 carbon atoms.

2. As a composition of matter, the compound having the formula

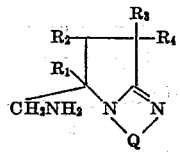

in which $R_1$, $R_3$, and $R_4$ are alkyl of 1 to 10 carbon atoms, $R_2$ is a hydrogen atom, and Q is ethylene.

3. As a composition of matter, the compound having the formula

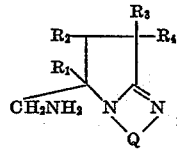

in which $R_1$ and $R_4$ are alkyl of 1 to 10 carbon atoms, $R_2$ is hydrogen, $R_3$ is methyl, and Q is ethylene.

4. As a composition of matter, the compound having the formula

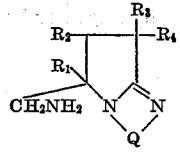

in which $R_1$ and $R_2$ taken collectively with the carbon atoms to which they are joined form a saturated carbocyclic ring of 6 carbon atoms, $R_3$ and $R_4$ are alkyl of 1 to 10 carbon atoms, and Q is ethylene.

5. As a composition of matter, the compound having the formula

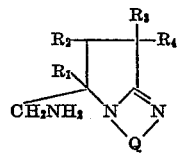

in which $R_1$ and $R_4$ are alkyl of 1 to 10 carbon atoms, $R_2$ and $R_3$ taken collectively with the carbon atoms to which they are joined form a saturated carbocyclic ring containing 6 carbon atoms, and Q is ethylene.

6. As a composition of matter, the compound having the formula

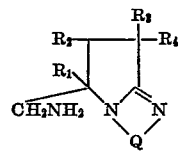

in which $R_1$ is alkyl of 1 to 10 carbon atoms, $R_2$ is alkyl of 1 to 4 carbon atoms, $R_3$ and $R_4$ taken collectively with the carbon atom to which they are joined form a saturated carbocyclic ring containing 6 carbon atoms, and Q is ethylene.

7. As a composition of matter, 5-aminomethyl-2,3,5,6-tetrahydro - 5,7,7-trimethyl-(7H)-imidazo[1,2-a]pyrrole.

8. As a composition of matter, 5-aminomethyl-5,6-dimethyl - 2,3,5,6-tetrahydro-(7H)-imidazo[1,2-a]pyrrole.

9. As a composition of matter, 5-aminomethyl-5,7-dimethyl - 7 - (2,2 - dimethylpropyl)-2,3,5,6-tetrahydro-(7H)-imidazo[1,2-a]pyrrole.

10. As a composition of matter, 6-aminomethyl-6,8,8-trimethyl - 2,3,4,6,7,8 - hexahydropyrrolo[1,2-a]pyrimidine.

11. As a composition of matter, spiro{cyclohexane-1,9'-[4a' - aminomethyl - 2',3',4a',6',7',8',8a' - octahydro-(9'H)-indolo[1,2-a]imidazole]}.

12. A method for the preparation of a compound having the formula

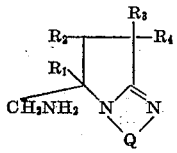

which comprises reacting substantially two equivalents of hydrogen in the temperature range of about 75° to 250° C. in the presence of a hydrogenation catalyst with substantially one equivalent of a compound having the formula

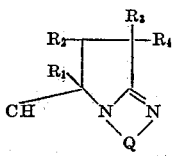

in which $R_1$ taken individually represents a member from the group consisting of alkyl, phenylalkyl, cycloalkyl, phenyl, naphthyl, and alkylphenyl of up to 10 carbon atoms, $R_2$ taken individually represents a member from the group consisting of hydrogen and alkyl of 1 to 4 carbon atoms, $R_3$ and $R_4$ taken individually represent members from the group consisting of alkyl, cycloalkyl, phenylalkyl, phenyl, naphthyl, and alkylphenyl of up to 10 carbon atoms, $R_1$ and $R_2$ taken collectively with the carbon atoms to which they are joined form a member from the group consisting of a saturated cabocyclic ring of 5 to 6 carbon atoms and said ring having alkyl substituents consisting of a total of up to 4 carbon atoms, $R_2$ and $R_3$ taken collectively with the carbon atoms to which they are joined form a member from the group consisting of a saturated carbocyclic ring of 5 to 6 carbon atoms and said ring having alkyl substituents consisting of a total of up to 4 carbon atoms, and $R_3$ and $R_4$ taken collectively with the carbon atoms to which they are joined form a member from the group consisting of a saturated carbocyclic ring of 5 to 6 carbon atoms and said ring having alkyl substituents consisting of a total of up to 4 carbon atoms, and Q represents a hydrocarbon chain of 2 to 3 carbon atoms between the nitrogen atoms to which it is joined, said Q containing up to about 18 carbon atoms.

13. A method according to claim 12 in which the temperatures employed are in the range of about 100° to 200° C. and the reaction is conducted in the presence of an inert volatile organic solvent.

14. A method according to claim 12 in which the reaction is conducted at pressures up to 10,000 p.s.i.g.

15. A method according to claim 14 in which the heterocyclic reactant and the catalyst are introduced into a pressure retention reaction vessel and then the hydrogen is added until the selected pressure is reached in the range of about 10,000 p.s.i.g.

References Cited in the file of this patent

Fieser et al.: Organic Chemistry, pages 226–227 (1950).
Grob et al.: Helvetica Chimica Acta, volume 33, pages 658–666 (1950).

UNITED STATES PATENT OFFICE

CERTIFICATE OF CORRECTION

Patent No. 2,993,049           July 18, 1961

Newman M. Bortnick et al.

It is hereby certified that error appears in the above numbered patent requiring correction and that the said Letters Patent should read as corrected below.

Column 7, lines 26 to 32, the formula should appear as shown below instead of as in the patent:

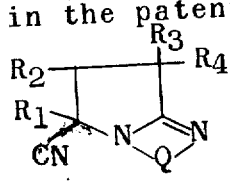

Signed and sealed this 28th day of November 1961.

(SEAL)

Attest:

ERNEST W. SWIDER
Attesting Officer

DAVID L. LADD
Commissioner of Patents
USCOMM-DC